United States Patent [19]

Herzl et al.

[11] 4,345,464
[45] Aug. 24, 1982

[54] CENTERING DEVICE FOR FLOWMETERS INTERPOSED IN FLOW LINE

[75] Inventors: Peter J. Herzl, Morrisville; Harold W. Metzger, Willow Grove; Richard L. Crumley, Southampton, all of Pa.

[73] Assignee: Fischer & Porter Company, Warminster, Pa.

[21] Appl. No.: 202,733

[22] Filed: Oct. 31, 1980

[51] Int. Cl.³ ............................................. G01F 15/18
[52] U.S. Cl. ........................................ 73/201; 29/272; 33/180 R; 285/31
[58] Field of Search ................ 73/861.12, 861.22, 201; 29/271, 272; 285/30, 31, 23; 33/180 R

[56] References Cited

U.S. PATENT DOCUMENTS

| | | | |
|---|---|---|---|
| 1,896,795 | 2/1933 | Kendall | 285/23 X |
| 3,643,983 | 2/1972 | Ludeman | 285/31 |
| 4,181,018 | 1/1980 | Schmoock | 73/861.12 |

*Primary Examiner*—Charles A. Ruehl
*Attorney, Agent, or Firm*—Michael Ebert

[57] ABSTRACT

A camming device for centering a meter or other instrument having a cylindrical body with respect to the upstream and downstream pipes of a flow line in which the meter is interposed. Each pipe is provided with an end flange having a circle of bolt holes, the pipe flanges being bridged by clamping bolts which pass through the holes to encage and compress the meter, the holes having clearances allowing limited bolt play. Rotatably mounted on the meter body is a camming device provided with a symmetrical array of camming edges that tangentially engage the bolts. When the device is turned on the meter body, it acts to force the bolts to their extreme hole positions, as a result of which the meter body is caused to assume a position concentric with the bolt circle that is centered with respect to the pipes.

9 Claims, 8 Drawing Figures

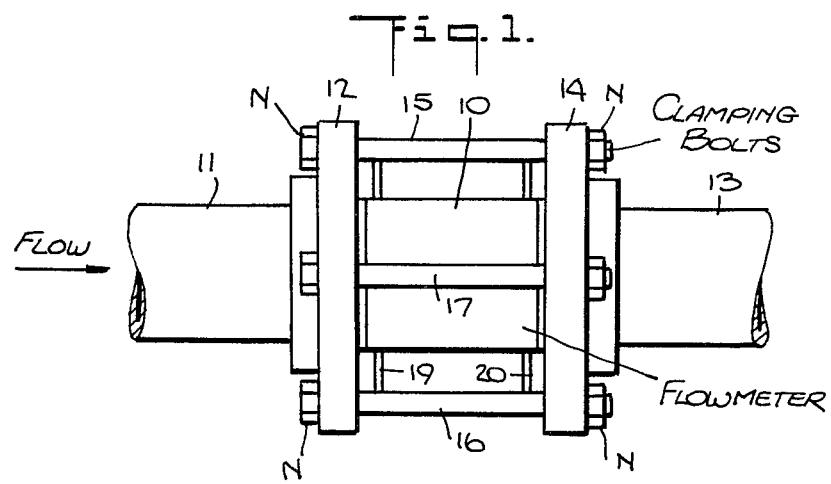
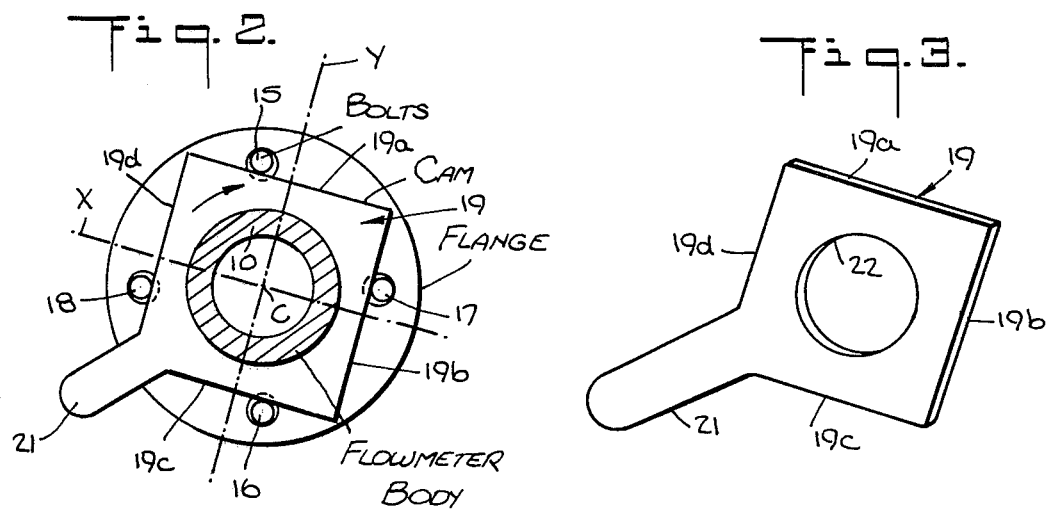
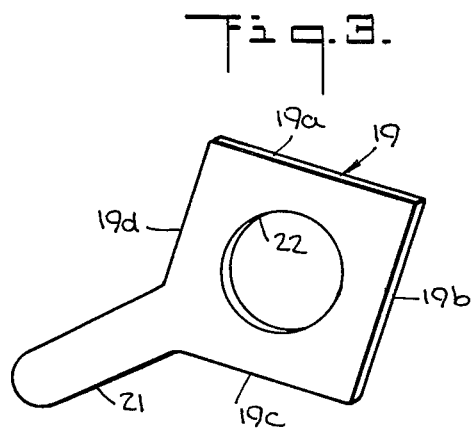
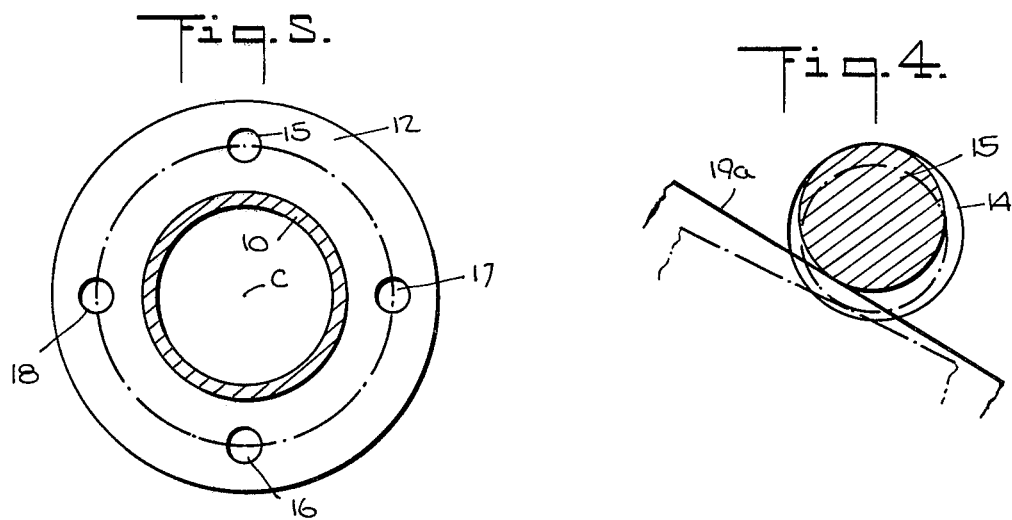

CENTERING DEVICE FOR FLOWMETERS INTERPOSED IN FLOW LINE

BACKGROUND OF INVENTION

This invention relates generally to the installation in a flow line of an instrument such as a flowmeter whose cylindrical body has a flow conduit therein in a manner centering the cylindrical body with respect to the line pipes, and more particularly to camming devices to facilitate such centering.

Though the invention is of particular value in connection with the installation of a flangeless electromagnetic flowmeter in a flow line, it is also applicable to other instruments such as valves and turbine meters which have cylindrical bodies and which suffer from similar centering problems. Hence while the invention will be described herein in the context of a flangeless electromagnetic flowmeter, it is to be understood that the invention is not limited to this application.

Typical of commercially-available electromagnetic flowmeters adapted to measure the volumetric flow rates of fluids such as acids, sewage and slurries which present difficult handling problems is the Fischer and Porter Co. (Warminster, Pa.) Model 10 D 1430 meter. Because a flowmeter of this type has an obstructionless flow conduit, it can be used to meter fluids without regard to heterogeneous consistency. The model 10 D 1430 flowmeter includes a carbon steel pipe spool flanged at both ends, the spool serving as the meter body.

In installing a standard flanged flowmeter in a flow line, the meter must be interposed between upstream and downstream pipes each having an end flange. For this purpose, the mounting flanges on the flowmeter are provided with a circle of bolt holes that register with the bolt holes in the end flange of the line pipes. The installation is made by bolting the end flanges of the upstream and downstream pipes to the corresponding mounting flanges of the meter. To prevent leakage of fluid, gaskets are sandwiched between the bolted flanges. Because of the matching bolt holes in the meter and the flanges, the installed meter is centered with respect to the line pipes.

Standard flanged magnetic flowmeters are relatively large, heavy and expensive. Compact flowmeters are now known which are of much shorter length and are flangeless, one such meter being disclosed in the Schmoock U.S. Pat. No. 4,181,018. A meter of this type is designed for compression mounting between the end flanges of the upstream and downstream line pipes, the bolts in this instance bridging the pipe flanges to compress and encage the flowmeter.

The term "flangeless," as used herein, is intended to cover a meter whose cylindrical body is entirely without flanges or is provided with small end flanges that lack bolt holes and serve only to press gaskets against the flanges of the line pipes to prevent leakage at these joints.

In a flangeless meter in which the meter compressed between the end flanges of the line pipes is encaged within a circular array of clamping bolts bridging these flanges, the bolts perform no centering action as in the case of flanged meters in which the bolts pass through complementary holes in the meter flanges. As a consequence, one is faced with the problem of misalignment between the flow conduit of the meter and the line pipes.

The performance of a flowmeter, and to a lesser extent that of the gaskets used to provide a seal between the ends of the meter and the line pipes, depends on correct meter centering. An improperly centered meter, because it is misaligned with the flow line, will cause changes in the hydraulic profile of the fluid conveyed by the line and give rise to local turbulence as the fluid passes through the meter. As a result, there are errors in meter readings.

One possible solution to this problem is to mount a template or dummy flange on the body of the meter, this dummy flange containing several sets of bolt hole patterns, the holes in the sets being interspersed. These sets are appropriate for a range of possible pipe flange bolt hole patterns. Thus when the flangeless meter is interposed between the flanged ends of upstream and downstream pipes, the dummy flange is then indexed until one of the hole sets is in registration with the existing bolt hole pattern in the pipe flanges. The bolts which bridge the pipe flanges then pass through the holes in the dummy flange and thereby center the meter.

However, a dummy flange represents an inadequate solution to the centering problem, for a flange of this type can only accommodate a limited number of bolt hole patterns, and this number is well below the number of possible bolt hole patterns encountered in existing flanged pipe lines. Thus in the United States, there are ANSI class 150 lb., 300 lb. and 600 lb. sizes among others, and there are equivalent international DIN and BS flange sizes, each having a distinct bolt hole pattern.

For example, while a flangeless flowmeter whose flow conduit has a 3-inch diameter is intended to be interposed in a pipe line having a like internal diameter, the installer at different installation sites is likely to be faced with different flange sizes. Centering then becomes a difficult problem for which there is no obvious solution.

Another factor which makes centering a problem, even with a dummy flange or centering template is the clearances which must be allowed between the clamping bolts and pipe flanges so that the flowmeter can always be assembled in the line. For this reason, the typical circle of bolt holes in a pipe flange is provided with bolt holes that are somewhat larger than the bolt dimension, thereby allowing some degree of play. This creates an uncertainty of location that is particularly bothersome on small flowmeters where the percentage of this uncertainty is high relative to the meter size.

SUMMARY OF INVENTION

In view of the foregoing, the main object of this invention is to provide a camming device for centering a flangeless meter having a cylindrical body with respect to the upstream and downstream pipes of a flow line in which the meter is interposed.

A significant feature of a camming device in accordance with the invention is that it takes advantage of the normal play present in a bolted pipe flange arrangement in order to remove any uncertainty as to the centered location of the meter.

More particularly, it is an object of the invention to provide a simple, low-cost camming device capable of centering a flowmeter of a given size with respect to pipes whose flanges come in many different forms with different bolt hole locations.

Yet another object of this invention is to provide a camming device which acts to center the meter on which it is rotatably mounted by forcing the clamping bolts surrounding the meter and bridging the pipe flanges toward their outward extreme positions within the bolt holes, at which point the cylindrical meter body is concentric with the circle of bolts.

Still another object of this invention is to provide a camming device which acts to center the meter on which it is rotatably mounted by forcing the clamping bolts surrounding the meter and bridging the pipe flanges toward their inward extreme positions within the bolt holes, at which point the cylindrical meter body is concentric with the circle of bolts.

Briefly stated, these objects are attained in a camming device for centering a meter or other instrument having a cylindrical body with respect to the upstream and downstream pipes of a flow line in which the meter is interposed. Each pipe is provided with an end flange having a circle of bolt holes, the pipe flanges being bridged by clamping bolts which pass through the holes to encage and compress the meter, the holes having clearances allowing limited bolt play.

Rotatably mounted on the meter body is a camming device provided with a symmetrical array of camming edges that tangentially engage the bolts. When the device is turned on the meter body, it acts to force the bolts to their extreme hole positions, as a result of which the cylindrical body of the meter body is caused to assume a position concentric with the bolt circle that is centered with respect to the pipes.

OUTLINE OF DRAWINGS

For a better understanding of the invention as well as other objects and further features thereof, reference is made to the following detailed description to be read in conjunction with the accompanying drawings, wherein:

FIG. 1 is an elevational view of a flangeless flowmeter installed by clamping bolts between the flanged ends of upstream and downstream pipes in a flow line, the flowmeter being provided with a pair of camming devices in accordance with a first preferred embodiment of the invention;

FIG. 2 is a transverse section taken through the installation in the plane indicated by lines 2—2 in FIG. 1;

FIG. 3 is a perspective view of the camming device;

FIG. 4 shows the relationship between one of the cam surfaces and the bolt in one of the holes in FIG. 2;

FIG. 5 shows the geometrical relationship between the centered meter body and the circle of bolt holes in one of the pipe flanges;

DESCRIPTION OF INVENTION

First Embodiment

Figure 6:
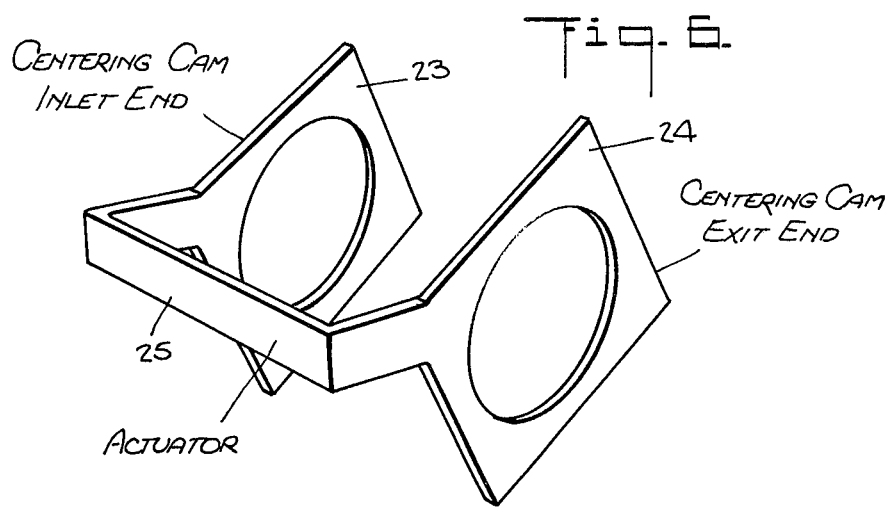
FIG. 6 shows, in perspective, a double camming device in accordance with a second embodiment of the invention.

Referring now to FIG. 1 of the drawings, there is shown a flangeless electromagnetic flowmeter 10, such as a meter of the type illustrated in the above-identified Schmoock patent. Meter 10 is interposed in a flow line to measure the flow rate of fluid conveyed thereby, the line having an upstream pipe 11 provided with an annular end flange 12 and a downstream pipe 13 provided with a like annular end flange 14.

The meter is compression-mounted by means of a set of four clamping bolts 15, 16, 17 and 18 which pass through a circle of bolt holes in the pipe flanges. The bolts which bridge the flanges are tightened at their threaded ends by nuts N. Bolts 15 to 18 are at 90 degree positions and are therefore equi-spaced about the bolt circle. In practice, there may be six, eight or twelve bolts in the set at equiangular positions rather than only four.

The bolts surround and encage meter 10 which has a cylindrical body. In the absence of a centering device in accordance with the invention, the bolts which do not go through mounting flange holes because the meter is flangeless, perform no centering function. In order, therefore, to center the meter, one would have to do this visually by trial and error by adjusting and readjusting the position of the meter and then tightening the nuts when the meter appears to be centered. This procedure is time-consuming and unreliable.

In accordance with the invention, two identical camming devices 19 and 20 are rotatably mounted adjacent the upstream and downstream ends of the meter body. Camming device 19, as shown separately in FIGS. 2 and 3, takes the form of a square plate of high strength metal such as aluminum or stainless steel having an actuator arm 21 projecting from one corner thereof. The square plate is provided with a central aperture 22 whose diameter matches the outer diameter of the cylindrical body of the meter, so that the plate can be fitted over the body and rotated thereon by an operator who manipulates actuator arm 21.

In practice, should the flangeless meter have small, circular end flanges to accommodate gaskets for sealing the meter against the pipe flanges, aperture 22 is then dimensioned to fit over these flanges rather than on the meter body; for it is essential that there be no significant play between the caming device and the body of the meter.

Each of the four straight edges 19a to 19d of the plate acts as a caming surface which tangentially engages bolts 15 to 18, respectively. It will be seen in FIG. 4, which shows only bolt 15 in a bolt hole H, that the diameter of the hole is larger than that of the bolt to allow the usual clearance therebetween. Bolt 15 is shown in dotted lines when it occupies its extreme inward position within hole H, and in full lines when it occupies its extreme outward position therein. The dimensions of plate 19 are such that it is receivable within the region whose boundaries are defined by the bolts.

When actuator arm 21 is turned clockwise by an installer, as shown in FIG. 2, the cam edges 19a, 19b, 19c and 19d, which are normal to the X and Y axes of the plate and intersect at the center C of the cylindrical meter body 10, ride against the clamping bolts which are initially in a loosened condition. This action forces the bolts outwardly against the outer extremities of their bolt holes, at which point no further movement of the caming device is possible. Because the distance between the center of each bolt along a line normal to the surface of the meter body is the same for all four bolts, the meter body, as shown in FIG. 5, now assumes a position concentric with the circle of bolt holes on the pipe flanges. At this position the meter body is centered with respect to the flow line pipes.

Since there is a camming device adjacent both ends of the meter body, each end is then centered with respect to its associated flow line pipe. The nuts N are then tightened to hold the meter in its properly centered state.

For pipe flanges having a set of six bolts, the appropriate centering plate would have a hexagonal form, each caming edge of which is tangential to a respective bolt. For the pipe flanges having a set of eight bolts, an eight-sided centering plate would be provided; and for a pipe flange having a set of twelve bolts, a twelve-sided centering plate would be provided.

It is important to note that the centering device in acting to force all clamping bolts to their extreme outward position in the bolt holes removes all play therefrom, thereby eliminating this variable from the centering inaccuracies. For a meter body of a given size, the same centering device can be used for a number of different pipe flanges as long as the throw of the centering device cam is sufficient to include the variations in bolt hole locations in these flanges. In some cases, an eight-bolt hole camming device will also function on four-bolt hole flanges.

Other Embodiments

Since a meter body interposed between upstream and downstream pipes requires centering at both the upstream and downstream ends, the two camming devices necessary for this purpose can be integrated into a single unit. Thus, as shown in FIG. 6, the centering unit is constituted by a pair of square plates 23 and 24 provided with central apertures and held in parallel relation by a connecting handle 25 whose ends are joined by arms to corresponding corners of the plates.

The spacing between plates 23 and 24 is appropriate to the length of the cylindrical meter body for which the unit is designed. The installer, in this instance, when manipulating the handle to turn plates 23 and 24 simultaneously about the meter body, then cams the bolts at the upstream and downstream ends to force them outwardly against their holes, causing the meter to assume a position concentric with the bolt circle.

Figure 7:
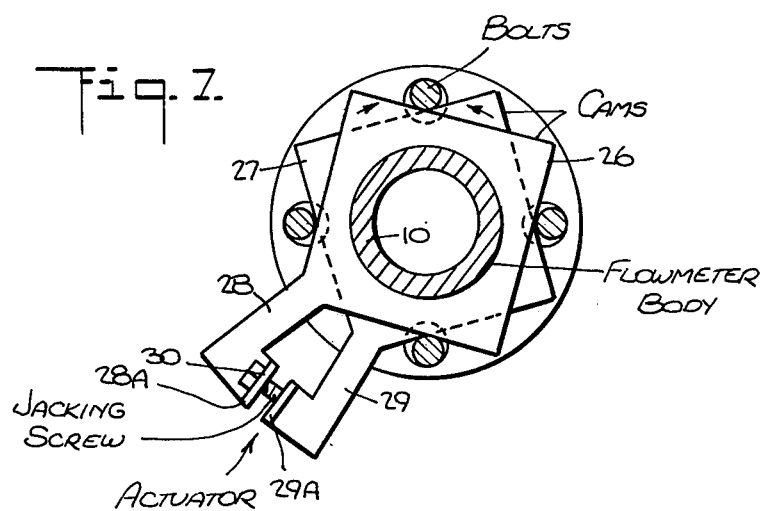
FIG. 7 shows a scissor plate camming device in accordance with a third embodiment of the invention.

In some cases, there is a need for a larger centering force that can be applied by manually turning a caming device of the type shown in FIGS. 1 to 6. The device shown in FIG. 7 is designed for heavier flowmeters which call for a larger centering force and permanent meter support. To this end, the centering device is constituted by a pair of superposed square plates 26 and 27 which have identical apertures, the two plates being angularly displaced in scissor-like fashion so that each bolt lies at the tangential intersection of the corresponding caming edges. Plates 26 and 27 are provided with actuator arms 28 and 29, respectively, which terminate in right angle brackets 28A and 29A that are interconnected by a jacking screw 30.

Thus when jacking screw 30 is turned in by a suitable tool, the actuator arms 28 and 29 are brought closer together, thereby causing plate 26 to turn in the clockwise direction and plate 27 to turn concurrently in the counterclockwise direction. The resultant scissor caming action on each bolt forces the bolt toward its extreme outward position in the bolt hole to center the meter body 10. Two such scissor-action centering devices are required for the upstream and downstream ends of the meter body.

In the centering devices described above, the camming action in all cases is such as to force the clamping bolts toward their extreme outward position in the bolt holes. In some situations, the clamping bolts surrounding the meter body are so close to the meter body that a square caming plate of the type shown in FIG. 1 would lack adequate structural strength; for then there would only be narrow and relatively weak areas of metal between the surface of the meter body and the bolts.

Figure 8:
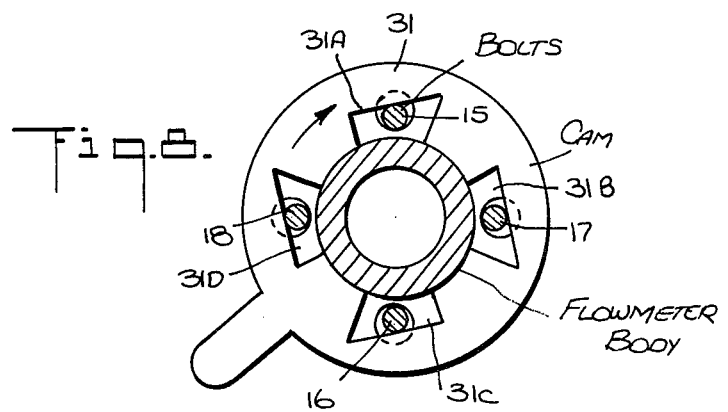
FIG. 8 shows a notched camming device in accordance with a fourth embodiment of the invention.

To overcome this drawback, the embodiment of a camming device shown in FIG. 8 takes the form of an annular metal plate 31 with an aperture whose diameter is appropriate to the cylindrical meter body for which it is intended, the plate having an actuator arm 32. Plate 31 is provided with four notches 31A, 31B, 31C and 31D indented from the inner periphery of the plate, each notch forming a straight camming edge that tangentially engages the outer end of the associated bolt (15 to 18).

Thus when annular plate 31 is turned clockwise, the camming edges then act to force each bolt toward the inward extremity of the bolt hole, thereby causing the meter body to assume a position concentric with the bolt circle and centered with respect to the flanged pipes.

While there have been shown and described preferred embodiments of a centering device for flowmeters interposed in flow line in accordance with the invention, it will be appreciated that many changes and modification may be made therein without, however, departing from the essential spirit thereof. Thus the invention is also applicable to vortexshedding flangeless flowmeters. And where the flangeless meter of the magnetic flowmeter or vortex type is provided with full face gaskets having bolt holes, the centering device will center these meters with respect to these gaskets.

We claim:

1. A caming device for a flowmeter or other instrument having a cylindrical body having a flow conduit therein adapted to center this body with respect to flanged upstream and downstream pipes of a flow line in which the meter is interposed, the pipe flanges being bridged by clamping bolts which pass through holes in a bolt circle in the flanges and act when tightened to encage and compress the meter, the holes having clearances therein allowing limited bolt play, said camming device comprising a plate having a central aperture whose diameter matches the outer diameter of the meter body whereby the plate is rotatable thereon, said plate having means to facilitate rotation thereof, said plate having a symmetrical array of camming edges that tangentially engage the bolts such that when the device is rotated on the meter body it acts to force the bolts to their extreme hole positions, as a result of which the body is caused to assume a position concentric with the bolt circle and centered with respect to the pipes.

2. A device as set forth in claim 1, wherein said means is an actuator arm extending laterally from the plate to a point outside the bolt cage.

3. A device as set forth in claim 2, wherein said bolt circle has four holes therein to receive four bolts and said plate has a square form, each edge of the plate engaging a respective one of said four bolts.

4. A device as set forth in claim 2, constituted by a pair of like plates, each fitting over a respective end of the meter body, the actuator arms of said plates being joined by a common handle to form an integrated device.

5. A device as set forth in claim 2, formed by a pair of like plates in superposed relation in scissor-like fashion, whereby each camming edge of one plate intersects the corresponding camming edge of the other plate, the intersecting edges of the plates tangentially engaging a respective bolt, and means including a jacking screw to join the actuator arms of said plates.

6. A device as set forth in claim 1, wherein said plate has outer edges which tangentially engage the bolts at their inner sides in the holes, whereby when the plate is rotated, said bolts are forced outwardly to their extreme outward positions in the holes.

7. A device as set forth in claim 1, wherein said plate is annular in form and is provided with notches indented from the inner periphery of the plate, each notch defining a camming edge engaging a respective bolt at its outer side in the hole whereby when the plate is rotated, said bolts are forced inwardly to their extreme inward positions in the holes.

8. A device as set forth in claim 1, wherein said device is fitted over a flangeless electromagnetic flowmeter body.

9. A device as set forth in claim 1, wherein said device is fitted over a flangeless vortex meter body.

* * * * *